United States Patent
Ahn et al.

(10) Patent No.: US 9,717,027 B2
(45) Date of Patent: Jul. 25, 2017

(54) METHOD FOR CHANGING GATEWAY IN MACHINE-TO-MACHINE (M2M) SYSTEM AND DEVICE THEREFORE

(71) Applicant: LG ELECTRONICS INC., Seoul (KR)

(72) Inventors: Hongbeom Ahn, Seoul (KR); Seongyun Kim, Seoul (KR); Heedong Choi, Seoul (KR); Seungmyeong Jeong, Seoul (KR); Seungkyu Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/758,635

(22) PCT Filed: Jan. 10, 2014

(86) PCT No.: PCT/KR2014/000318
§ 371 (c)(1),
(2) Date: Jun. 30, 2015

(87) PCT Pub. No.: WO2014/109597
PCT Pub. Date: Jul. 17, 2014

(65) Prior Publication Data
US 2015/0358874 A1    Dec. 10, 2015

Related U.S. Application Data

(60) Provisional application No. 61/751,272, filed on Jan. 11, 2013.

(51) Int. Cl.
*H04W 4/00* (2009.01)
*H04W 36/12* (2009.01)
(Continued)

(52) U.S. Cl.
CPC ............ *H04W 36/12* (2013.01); *H04L 12/66* (2013.01); *H04L 41/082* (2013.01);
(Continued)

(58) Field of Classification Search
CPC ..................................................... H04W 36/14
(Continued)

(56) References Cited

U.S. PATENT DOCUMENTS

| 2012/0155406 A1 | 6/2012 | Kim et al. | |
| 2012/0243422 A1* | 9/2012 | Jokimies | H04W 4/006 370/242 |

(Continued)

FOREIGN PATENT DOCUMENTS

| CN | 102300192 A | 12/2011 |
| CN | 102448141 A | 5/2012 |

(Continued)

*Primary Examiner* — Shripal Khajuria
(74) *Attorney, Agent, or Firm* — Birch, Stewart, Kolasch & Birch, LLP

(57) ABSTRACT

The present invention relates to a gateway changing method performed by a machine-to-machine (M2M) gateway which communicates with at least one M2M device having a constrained capability in an M2M system that includes a first layer and a second layer, and the a device therefor, the method comprising the steps of: receiving a trigger signal for indicating a gateway change through a first layer of the M2M gateway; and transmitting, to an M2M server, a first notification for indicating the gateway change through the first layer of the M2M gateway, wherein the M2M device having the constrained capability is a device that does not have the first layer, data generated in the second layer of the M2M device having the constrained capability is managed or stored in a data structure of a tree structure by the first layer of the M2M gateway, and the data structure that
(Continued)

includes the data is retrieved by the M2M server after the notification has been transmitted to the M2M server.

14 Claims, 9 Drawing Sheets

(51) Int. Cl.
    *H04W 48/16*     (2009.01)
    *H04L 12/66*     (2006.01)
    *H04L 12/24*     (2006.01)
    *H04L 29/08*     (2006.01)
    *H04W 88/16*     (2009.01)

(52) U.S. Cl.
    CPC .......... *H04L 41/0853* (2013.01); *H04L 67/12* (2013.01); *H04W 4/005* (2013.01); *H04W 48/16* (2013.01); *H04L 41/0226* (2013.01); *H04L 41/0846* (2013.01); *H04W 88/16* (2013.01)

(58) Field of Classification Search
    USPC ........................................................ 370/331
    See application file for complete search history.

(56) References Cited

U.S. PATENT DOCUMENTS

| | | |
|---|---|---|
| 2012/0265983 A1 | 10/2012 | Yegin et al. |
| 2012/0281658 A1 | 11/2012 | Rikkinen et al. |
| 2013/0013793 A1 | 1/2013 | Sanchez Herrero |
| 2013/0203394 A1* | 8/2013 | Dong .................. H04W 4/005 455/414.1 |

FOREIGN PATENT DOCUMENTS

| | | |
|---|---|---|
| KR | 10-2012-0070443 A | 6/2012 |
| KR | 10-2012-0106278 A | 9/2012 |
| WO | WO 2011/112683 A1 | 9/2011 |
| WO | WO 2012/109531 A2 | 8/2012 |
| WO | WO 2012/118711 A2 | 9/2012 |

\* cited by examiner

METHOD FOR CHANGING GATEWAY IN MACHINE-TO-MACHINE (M2M) SYSTEM AND DEVICE THEREFORE

CROSS REFERENCE TO RELATED APPLICATIONS

This application is the National Phase of PCT International Application No. PCT/KR2014/000318 filed on Jan. 10, 2014, which claims priority under 35 U.S.C. 119(e) to U.S. Provisional Application No. 61/751,272, filed on Jan. 11, 2013, all of which are hereby expressly incorporated by reference into the present application.

TECHNICAL FIELD

The present invention pertains to a wireless communication system, in particular, changing a gateway in a machine-to-machine (M2M) system.

BACKGROUND ART

Recently, interest in M2M (machine-to-machine) communication is rising. The M2M communication corresponds to communication performed between machines without a human involvement. The M2M communication is also called MTC (machine type communication) or IoT (internet of things) communication. A terminal used for the M2M communication is called a M2M device. In general, the M2M device has characteristics such as low mobility, time tolerant or delay tolerant, small data transmission and the like. The M2M device is used in a manner of being connected with a M2M server, which stores and manages M2M communication information at the center. If a M2M device is connected according to a communication scheme different from each other, the M2M device and the M2M server are connected with each other via a M2M gateway in a section where a communication scheme is changed. In doing so, a whole M2M system can be constructed. Such a service as object tracking, power metering, automatic payment system, healthcare service, remote controlling, and the like can be provided by the M2M system.

The present invention relates to a M2M system.

DISCLOSURE OF THE INVENTION

Technical Tasks

One object of the present invention is to provide a method of efficiently transmitting and receiving a signal in a M2M system and a device therefor. Another object of the present invention is to provide a method of efficiently changing a M2M gateway in a M2M system and a device therefor. Another object of the present invention is to provide a method of making data not to be lost in a M2M system while a M2M gateway is changed and a device therefor. The other object of the present invention is to provide a method of minimizing interruption of a M2M service in a M2M system while a M2M gateway is changed and a device therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

In an aspect of the present invention, provided herein is a method of changing a gateway by a M2M gateway communicating with at least one or more M2M devices having constrained capability in a M2M (machine-to-machine) system comprising a first layer and a second layer, the method comprising: receiving a trigger signal, indicating gateway change via a first layer of the M2M gateway; and transmitting a first notification indicating the gateway change to a M2M server via the first layer of the M2M gateway, wherein the M2M device having the constrained capability correspond to a device not containing the first layer, wherein data generated in the second layer of the M2M device having the constrained capability is managed or stored in a data structure of a tree structure by the first layer of the M2M gateway and wherein the data structure containing the data is retrieved by the M2M server after the notification is transmitted to the M2M server.

In another aspect of the present invention, provided herein is a gateway communicating with at least one or more M2M devices having constrained capability in a M2M system comprising a first layer and a second layer, the gateway comprising: an RF (radio frequency) unit; and a processor, the processor configured to receive a trigger signal indicating gateway change via a first layer of the M2M gateway, the processor configured to transmit a first notification indicating the gateway change to a M2M server via the first layer of the M2M gateway, wherein the M2M device having the constrained capability corresponds to a device not containing the first layer, wherein data generated in the second layer of the M2M device having the constrained capability is managed or stored in a data structure of a tree structure by the first layer of the M2M gateway and wherein the data structure containing the data is retrieved by the M2M server after the notification is transmitted to the M2M server.

Preferably, the first layer corresponds to a common service layer containing services commonly provided by the M2M system and the second layer corresponds to an application layer executing a specific M2M application.

Preferably, the data structure comprises first information indicating a gateway change status and second information indicating identification information of a target gateway, and the trigger signal comprises a value of the first information configured by a specific value.

Preferably, the data structure comprises a first lower data structure for the M2M server and wherein the first notification comprises a URI (universal resource identifier) of the first lower data structure.

Preferably, the M2M server is configured to retrieve and store the data structure using the URI.

Preferably, the data structure comprises a second lower data structure for the M2M device, further comprising the step of transmitting a second notification indicating the gateway change to the M2M device via the first layer, wherein the M2M device does not transmit any information to the M2M gateway until the gateway change is completed after the M2M device receives the second notification.

Advantageous Effects

According to the present invention, it is able to efficiently transmit and receive a signal in a M2M system. According to the present invention, it is able to efficiently change a M2M gateway in the M2M system. According to the present invention, it is able to make data not to be lost in the M2M system while the M2M gateway is changed. According to the present invention, it is able to minimize interruption of a M2M service in the M2M system while the M2M gateway is changed.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention, illustrate embodiments of the invention and together with the description serve to explain the principle of the invention.

MODE FOR INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

In some instances, well-known structures and devices are omitted in order to avoid obscuring the concepts of the present invention and important functions of the structures and devices are shown in block diagram form. The same reference numbers will be used throughout the drawings to refer to the same or like parts.

In the present invention, a machine-to-machine (M2M) device refers to a device for M2M communication. The M2M device may be fixed or mobile. The M2M device may transmit and receive user data and/or control information to/from an M2M server by communicating with the M2M server. The M2M device may be referred to as terminal equipment, Mobile Station (MS), Mobile Terminal (MT), User Terminal (UT), Subscriber Station (SS), wireless device, Personal Digital Assistant (PDA), wireless modem, handheld device, etc. The M2M server refers to a server for M2M communication, and is typically a fixed station or a mobile station. In the present invention, an M2M gateway refers to an apparatus serving as a connection point entering one network to another network when a network to which an M2M device is attached and a network to which an M2M server is attached are different from each other.

In addition, in the present specification, the term "entity" may refer to a hardware such as an M2M device, an M2M gateway, or an M2M server, or the term "entity" may refer to a software component of M2M application layer or M2M (common) service layer as described below.

Figure 1:
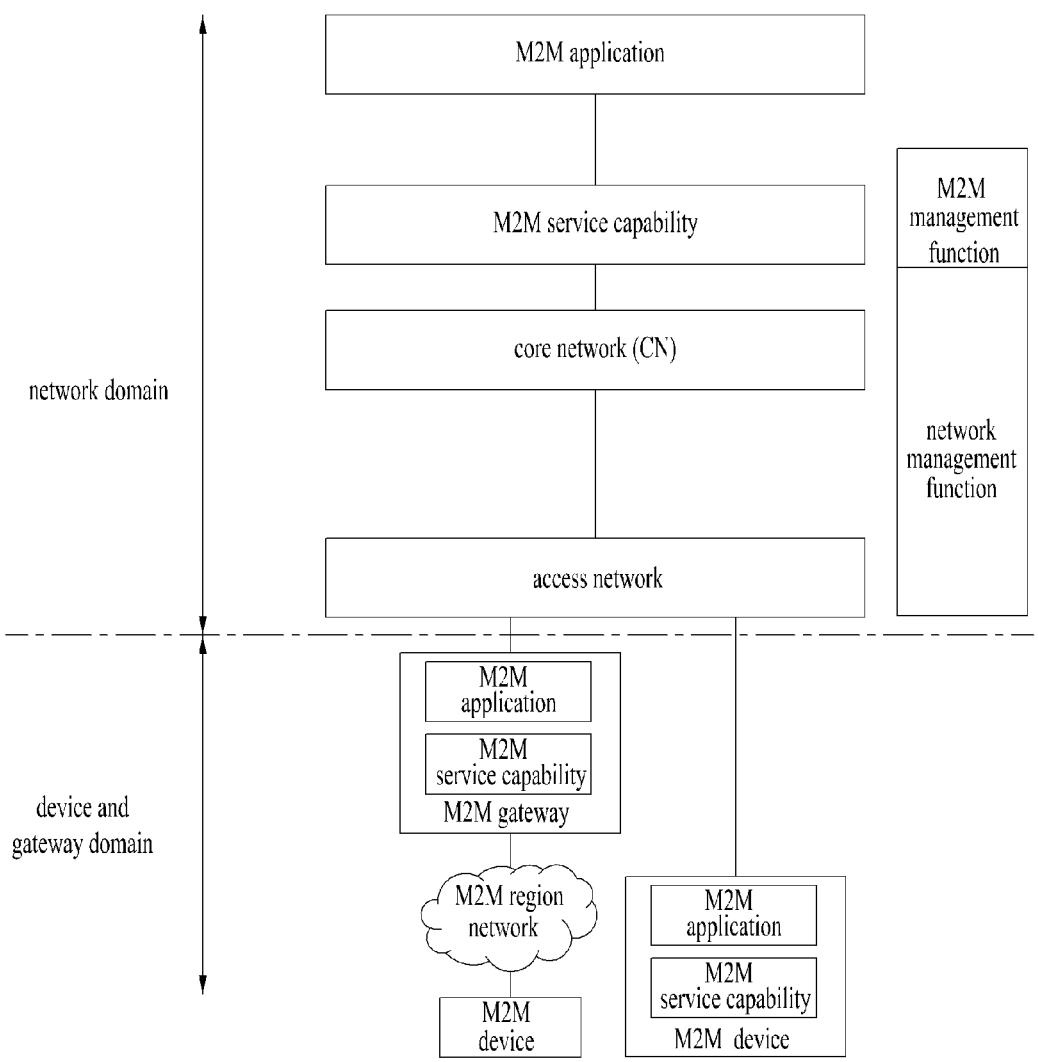
FIG. 1 shows an example of a M2M system.

FIG. 1 shows an example of a M2M system. FIG. 1 shows an example of a M2M system according to ETSI (European telecommunications standards institute) TS (technical specification).

The M2M system according to the ETSI TS defines a common M2M service framework for various M2M applications. A M2M application may indicate a software component implementing such a M2M service solution as e-health, city automation, a connected consumer, automotive and the like. The M2M system provides functions commonly necessary for implementing the various M2M applications and the commonly necessary functions can be called a M2M service or a M2M common service. If the M2M common service is used, a M2M application can be easily implemented without configuring a basic service framework again for each M2M application.

The M2M service is provided in a form of service capability (SC), the M2M application approaches to the SC (service capability) via an open interface and may be able use a M2M service provided by the SC (service capability). The SC (service capability) may correspond to a set of functions of a M2M service capable of being used when the M2M application is provided on a service framework. The SC (service capability) is a common name for an SC entity (service capability entity) and an SC layer (service capability layer).

The SC (service capability) can be represented as xSC. In this case, x can be represented by one of N, G and D. The x indicates where the SC (service capability) exists among a network (and/or a server), a gateway and a device. For instance, NSC indicates SC (service capability) existing in a network and/or a server and GSC indicates SC (service capability) existing in a gateway.

A M2M application may exist in a network, a gateway or a device. The M2M application existing in the network or a server in a manner of being directly connected with the server can be called a M2M network application or can be simply called a NA (network application). For instance, the NA corresponds to software which is implemented in a manner of being directly connected with a server and may be able to perform a role of communicating with a M2M gateway or a M2M device and managing the M2M gateway and the M2M device. The M2M application existing in the device can be called a M2M device application or can be simply called a DA (device application). For instance, the DA corresponds to software which is implemented in a M2M device and may be able to deliver sensor information and the like to the NA. The M2M application existing in the gateway can be called a M2M gateway application or can be simply called a GA (gateway application). For instance, the GA may play a role of managing a M2M gateway and may be able to provide SC (service capability) to the DA. The M2M application is a common name for an application entity (AE) and an application layer.

Referring to FIG. 1, a M2M system architecture can be divided into a network domain and a device and gateway domain. The network domain can include functions for M2M system management and functions for network management. The functions for the M2M system management can be performed by a M2M application managing devices existing in the device and gateway domain and M2M SC (service capability). The functions for the network management can be performed by a core network and an access network. Hence, in the example shown in FIG. 1, the core network and the access network provide connection between entities instead of performing a M2M function. M2M communication can be performed between M2M SC (service capability) in the network domain and the device and gateway domain via the core network and the access network. A M2M application of each domain can give and take a signal or information via M2M SC (service capability) of each domain.

The access network corresponds to an entity enabling the M2M device and gateway domain to communicate with the core network. Examples of the access network include xDSL (digital subscriber line), HFC (hybrid fiber coax), satellite, GERAN, UTRAN, e-UTRAN, wireless LAN, WiMAX and the like.

The core network corresponds to an entity providing such a function as IP (internet protocol) connection, service and network control, interconnection, roaming and the like. The core network includes a 3GPP ($3^{rd}$ generation partnership project) core network, an ETSI TISPAN (telecommunications and internet converged services and protocols for advanced networking) core network, a 3GPP2 core network and the like.

M2M SC (service capability) provides a M2M common service function (CSF) capable of being shared by various M2M network applications, exposures a M2M service via an open interface and enables M2M applications to use the M2M service. The M2M SC (service capability) entity can be comprehended as one instance of the common service functions (CSFs) and provides a subset of the common service functions (CSFs) capable of being used and shared by M2M applications. A M2M SCL (service capability layer) may correspond to a layer including the M2M SC entity.

A M2M application corresponds to an entity operating service logic and the entity capable of using M2M SC (service capability) via an open interface. A M2M application layer indicates a layer including the M2M application and a related operational logic.

A M2M device corresponds to an entity operating a M2M device application via M2M SC (service capability). The M2M device can directly communicate with a M2M server of a network domain and can communicate with the M2M server of the network domain via a M2M gateway. In case of being connected via the M2M gateway, the M2M gateway operates like a proxy. The M2M device can include a M2M application and/or M2M SC (service capability).

A M2M area network provides connectivity between the M2M device and the M2M gateway. In this case, a network between the M2M gateway and a M2M server and a network between the M2M device and the M2M gateway may be different from each other. For instance, the M2M area network can be implemented using such a PAN (personal area network) technology as IEEE 802.15.1, Zigbee, Bluetooth, IETF ROLL, ISA 100.11a and such a local network technology as PLC (power line communication), M-BUS, wireless M-BUS, KNX and the like.

The M2M gateway corresponds to an entity managing a M2M application via M2M SC (service capability) and the entity providing a service to the M2M application. The M2M gateway performs a role of a proxy between a M2M device and a network domain and can perform a role of providing a service to an ETSI non-compliant M2M device. The M2M gateway may correspond to an entity equipped with a function of a gateway among M2M devices. The M2M gateway can include a M2M application and/or M2M SC (service capability).

The M2M architecture shown in FIG. 1 is just an example and a name of each entity may vary. For instance, in a system according to an one M2M technical specification, M2M SC (service capability) can be called a M2M common service entity (CSE) and an SCL (service capability layer) can be called a common service layer (CSL). And, a M2M application can be called an application entity (AE) and a M2M application layer can be simply called an application layer. Similarly, a name of each domain may vary as well. For instance, in one M2M system, a network domain can be called an infrastructure domain and a device and gateway domain can be called a field domain.

As shown in FIG. 1, a M2M system can be comprehended as a layered structure including a M2M application layer and a M2M SC (service capability) layer for M2M communication.

Figure 2:
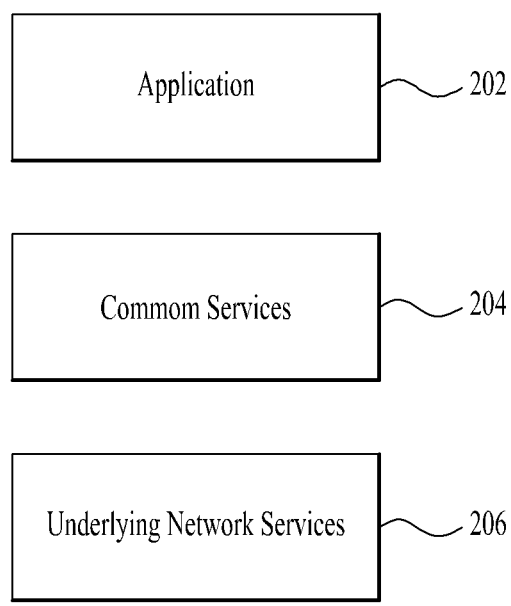
FIG. 2 shows an example of a layered structure of a M2M system.

FIG. 2 shows an example of a layered structure of a M2M system.

Referring to FIG. 2, a M2M system can include an application layer 202, a common service layer 204 and an underlying network services layer 206. As mentioned in the foregoing description, the application layer 202 corresponds to a M2M application layer and the common service layer 204 may correspond to a M2M SCL. The underlying network services layer 206 provides such services as device management, a location service and device triggering existing in a core network to the common service layer 204.

Figure 3:
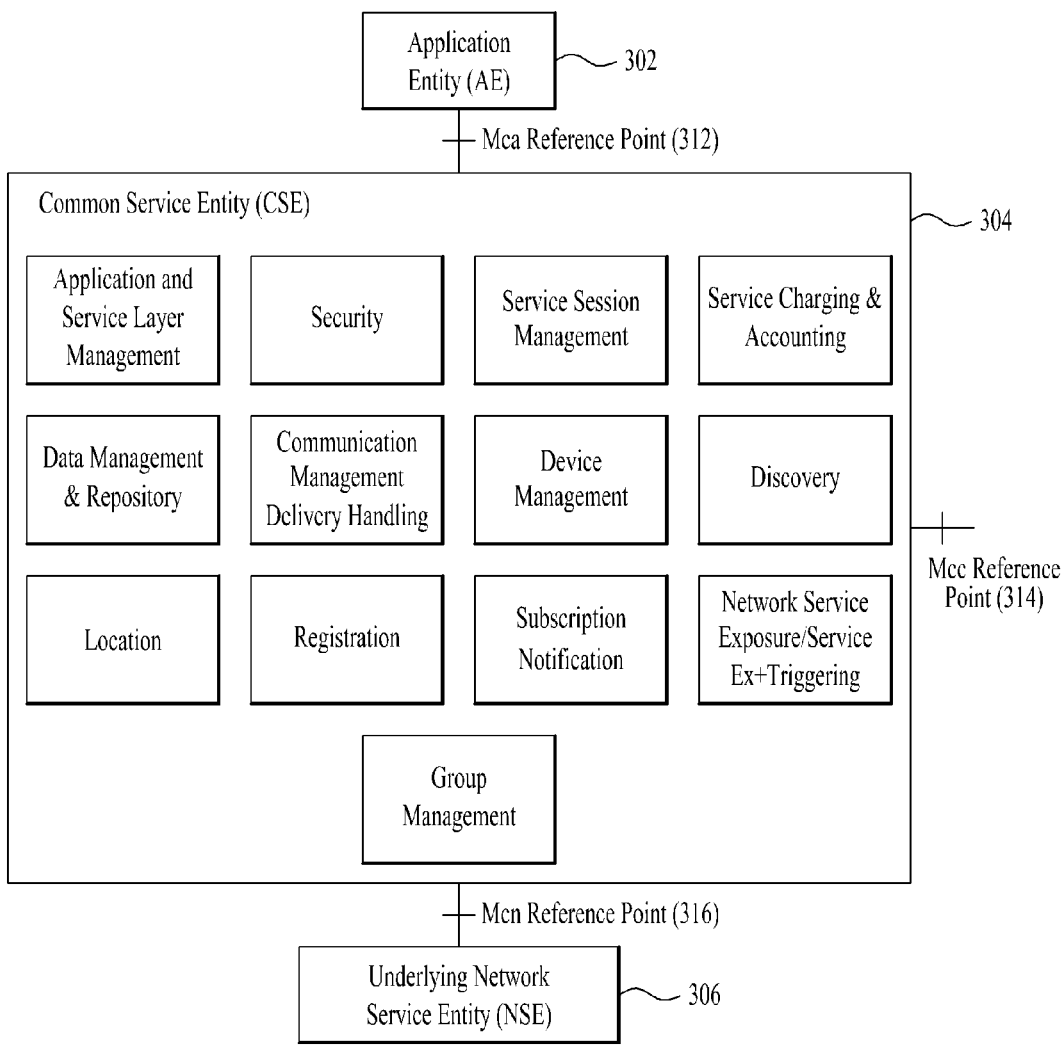
FIG. 3 shows an example of a functional architecture of a M2M system.

FIG. 3 shows an example of a functional architecture of a M2M system. In terms of functionality, M2M system architecture can include an application entity (AE) 302, a common service entity (CSE) 304, and an underlying network service entity (NSE) 306. Each of the entities 302/304/306 can communicate with each other via a reference point supported by the common service entity 304. The reference point plays a role in designating a communication flow between each of the entities 302/304/306. The reference point can be represented as Mcx and Mc means "M2M communications". In the present specification, a Mca reference point, a Mcc reference point and a Mcn reference point can be represented as Mca, Mcc and Mcn, respectively.

Referring to FIG. 3, a Mca reference point 312 designates a communication flow between the application entity (AE) 302 and the common service entity (CSE) 304. The Mca reference point 312 enables the AE 302 to use a service provided by the CSE 304 and enables the CSE 304 to communicate with the AE 302. The Mca reference point 312 may indicate an interface between a M2M application layer and a M2M common service layer.

A Mcc reference point 314 designates a communication flow between common service entities (CSEs) 304 different from each other. The Mcc reference point 314 enables the CSE 304 to use a service of a different CSE when the CSE 304 provides necessary functions. A service provided by the Mcc reference point 314 may be dependent on the functions supported by the CSE 304. The Mcc reference point 314 may indicate an interface between M2M common service layers.

A Mcn reference point 316 designates a communication flow between the CSE 304 and the underlying network service entity (NSE) 306. In order to make the CSE 304 provide required functions, the Mcn reference point 316 enables the CSE to use a service provided by the NSE 306. The Mcn reference point 312 may indicate an interface between the M2M common service layer and the M2M underlying network layer.

In the example shown in FIG. 3, the CSE 304 can provide various common service functions (CSFs). For instance, the CSE 304 can include at least one selected from the group consisting of an application and service layer management function, a communication management and delivery handling function, a data management and repository function, a device management function, a group management function, a discovery function, a location function, a network service exposure/service execution and triggering function, a registration function, a security function, a service charging and accounting function, a service session management function, and a subscription/notification function. The CSE 304 indicates an instance of the common service functions and provides a subset of the common service functions capable of being used and shared by M2M applications. The common service functions are schematically explained in the following.

Application and service layer management (ASM): provides a management function of AEs and CSEs. For instance, the ASM function configures functions of the CSEs, troubleshoots the functions of the CSEs and upgrades the functions. Moreover, the ASN function can upgrade a function of the AEs.

Communication management and delivery handling (CMDH): provides communication with different CSEs, AEs and NSEs. For instance, the CMDH function determines timing and a method of using a connection for CSE-to-CSE communication and can control specific requests to be delivered in a manner of being delayed.

Data management and repository (DMR): enables M2M applications to exchange and share data with each other. For instance, the DMR function collects great amount of data, aggregates the data with each other, convert the data into a specific format and can store the converted data.

Device management (DMG): manages a device function not only for a M2M gateway and a M2M device but also for devices existing in a M2M area network. For instance, the DMG function can perform application installation and configuration, firmware update, logging, monitoring, diagnostics, network topology management and the like.

Discovery (DIS): searches for information such as information and a resource within a given range and condition according to a request.

Group management (GMG): For instance, a group can be generated in a manner of combining a resource and a M2M device or a M2M gateway with each other, this function handles a group-related request.

Location (LOC): This function enables a M2M application to obtain location information of a M2M device or a M2M gateway.

Network service exposure/service execution and triggering (NSSE): enables communication of an underlying network to be performed and makes a service or a function provided by the underlying network available.

Registration (REG): This function enables a M2M application or a different CSE to register at a specific CSE. Registration is performed to use a M2M service function of the specific CSE.

Security (SEC): performs a role in handling of sensitive data such as a security key, establishing security-related association, authentication, authorization, protecting ID (identity) and the like.

Service charging and accounting (SCA): performs a role in providing a charging function to a CSE.

Service session management (SSM): performs a role in managing a M2M session of a service layer for end-to-end communication.

Subscription/notification (SUB): when a change for a specific resource is subscribed, if the resource is changed, performs a role in notifying the change.

Figure 4:
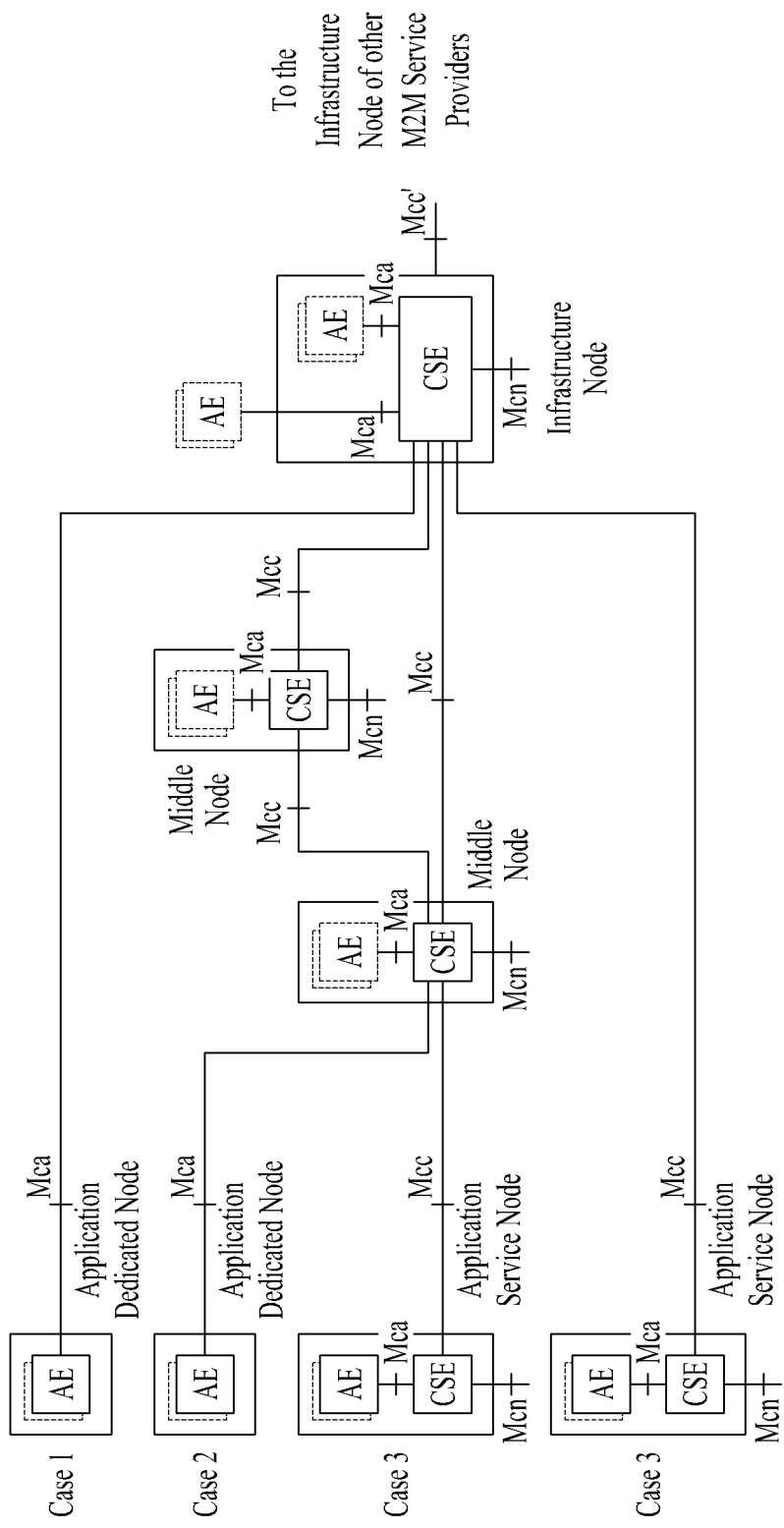
FIG. 4 is a diagram for an example of a M2M system configuration.

FIG. 4 is a diagram for an example of a M2M system configuration. In the present specification, a node corresponds to an entity including one or more M2M applications or an entity including one CSE and a M2M application equal to or greater than 0.

Although an application dedicated node (ADN) includes at least one or more application entities (AEs), the application dedicated node (AND) may indicate a node not including a common service entity (CSE). The ADN can communicate with a middle node (MN) or an infrastructure node (IN) via a Mca. The ADN can be called a M2M device having a constrained capability. In this case, the M2M device having a constrained capability may correspond to a M2M device not including a common service layer or a common service entity (CSE). The M2M device having a constrained capability can be simply called a constrained M2M device.

An application service node (ASN) includes at least one or more common service entities (CSEs) and may indicate a node including at least one or more M2M application entities (AEs). The ASN can communicate with one middle node or an infrastructure node via a Mcc. The ASN can be called a M2M device.

A middle node (MN) may indicate a node including one common service entity (CSE) and M2M application entity (AE) equal to or greater than 0. The MN can communicate with an infrastructure node (IN) or a different middle node (MN) via a Mcc. Or, the MN can communicate with the IN/MN/ASN via the Mcc. Or, the MN can communicate with the ADN via the Mca. The MN can be called a M2M gateway.

An infrastructure node (IN) includes a common service entity (CSE) and may indicate a node including an application entity (AE) equal to or greater than 0. The IN can communicate with at least one or more middle nodes (MNs) and/or at least one or more ASNs. Or, the IN can communicate with one or more ADNs via a Mcs. The IN can be called a M2M server.

Referring to FIG. 4, a case 1 shows an example of communication performed between an ADN 402 and an IN 422. The ADN 402 may correspond to a M2M device having a constrained capability. In this case, since the ADN 402 does not include a CSE or a common service layer, the ADN can communicate with a CSE of the IN 422 via the Mca. In this case, since the ADN 402 does not include a CSE or a common service layer, the ADN is unable to store data generated by an AE or an application layer. Hence, in the case 1, the data generated by the AE or the application layer of the ADN 402 can be stored in the CSE of the IN 422.

A case 2 shows an example of communication performed between an ADN 404 and an MN 414. The ADN 404 may also correspond to a M2M device having a constrained capability. Hence, the ADN can operate similar to an operation of the case 1 except a point that the ADN 404 is communicating with a CSE of the MN 414. In particular, the ADN 404 can communicate with the CSE of the MN 414 via the Mca. And, since the ADN 404 does not include a CSE or a common service layer, the ADN is unable to store data generated by an AE or an application layer. Hence, the data generated by the AE or the application layer of the ADN 404 can be stored in the CSE of the IN 414.

Meanwhile, in the case 2, the MN 414 can communicate with the IN 422 via an MN 412. In this case, the MN 414 and the MN 412 can communicate with each other and the MN 412 and the IN 422 can communicate with each other via the Mcc. The MN 414 can communicate with the IN 422 without passing through the MN 412.

A case 3 shows an example of communication performed between an ASN 406 and the MN 414. Unlike the case 1 or the case 2, since the ASN 406 includes a CSE or a common service layer, data generated by an AE or an application layer of the ASN 406 can be stored in the CSE or the common service layer of the ASN 406. And, the AE of the ASN 406 can communicate with a CSE of the MN 414 via the CSE of the ASN 406.

A case 4 shows an example of communication performed between an ASN 408 and the MN 414. Compared to the case 3, a CSE of the ASN 408 can directly communicate with a CSE of the IN 422 without passing through the MN.

The IN 422/424 can be positioned at an infrastructure domain or a network domain and can include one CSE and an AE equal to or greater than 0. The INs 422/424 can communicate with each other via the Mcc.

Figure 5:
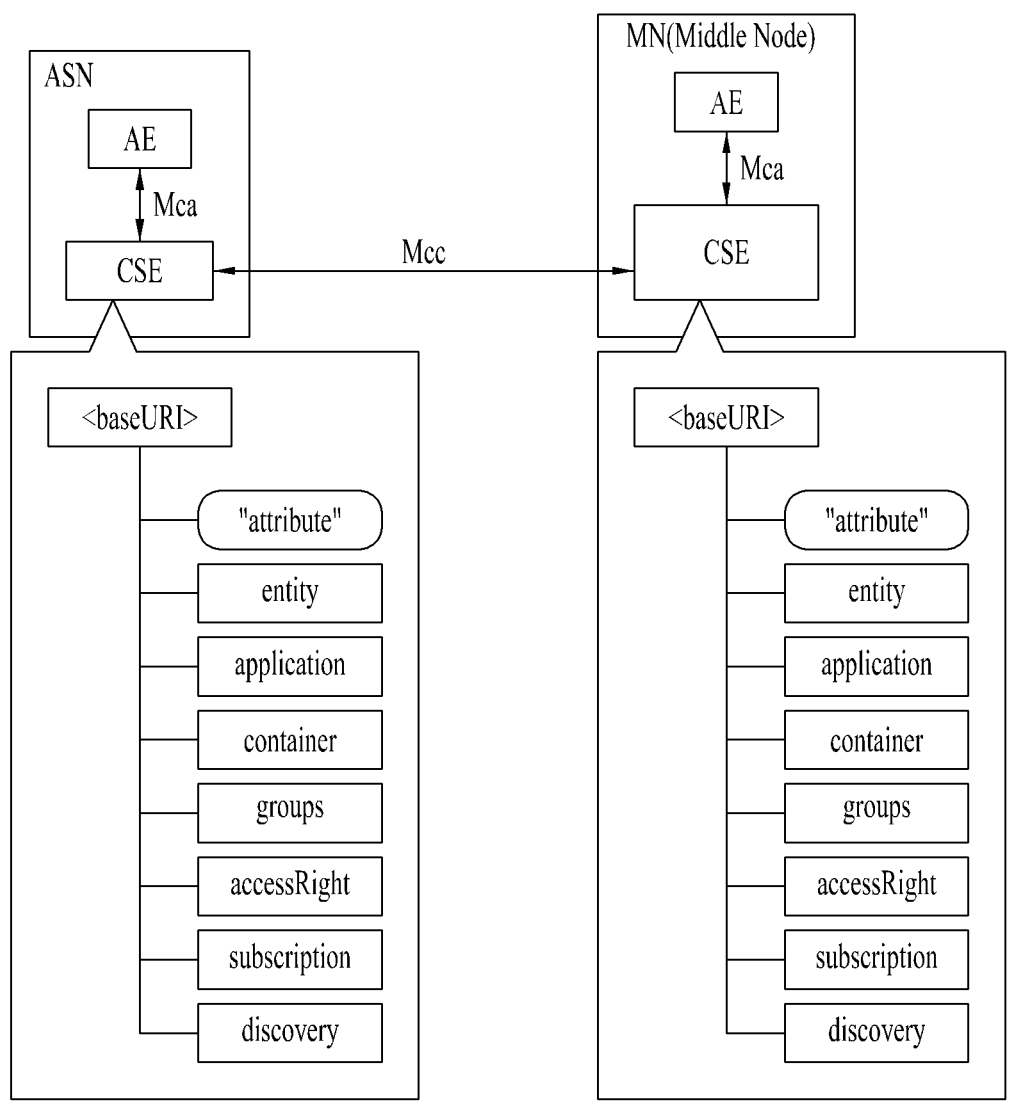
FIG. 5 is a diagram for an example of resources used in a M2M system.

FIG. 5 is a diagram for an example of resources used in a M2M system.

In a M2M system, an application entity (AE), a CSE, data and the like can be represented as a resource. In the M2M system, the resource indicates a data structure capable of being uniquely addressed using a unique address (e.g., URI (universal resource identifier or uniform resource identifier)). In the M2M system, the resource may have a tree structure, can be managed and stored by a CSE or a common service layer and can be logically connected with each other. Hence, a M2M device, a M2M gateway, a CSE or a common service layer of a M2M server can include the resource. On the contrary, an AE or an application layer of the M2M system is unable to have the resource. In a M2M resource including a tree structure, a baseURI corresponds to a root resource and the baseURI can include an attribute and a child resource.

Various resources are defined in a M2M system. M2M applications can perform communication based on the resources. For instance, the resources can be used for a M2M service such as registration of an application, reading a sensor value and the like. When an instance is generated, unique address information (e.g., URI) is given to each resource. Similar to a root resource, each resource can include an attribute and a child resource. Each resource can be addressed using unique address information.

An attribute stores information on a resource itself and is unable to include a child resource. A child resource can include an attribute of the child resource and a child resource of its own. For instance, a child resource includes a CES resource, an application resource, an access right resource, a container resource, a group resource, a subscription resource, a discovery resource and the like.

The CSE resource corresponds to a resource existing at a lower part of a baseURI/entity and includes information of a different CSE registered (connected) at a corresponding CSE.

The application resource corresponds to a resource existing at a lower part of a baseURI/application or a baseURI/entity/(specific CSE)/application. If the application resource exists at the lower part of the baseURI/application, information of applications registered (connected) at a corresponding CSE is stored. If the application resource exists at the lower part of the baseURI/entity/(specific CSE)/application, information of applications registered at a CSE named as "(specific CSE)" is stored.

The access right resource corresponds to a resource existing at a lower part of a baseURI/accessRight and the resource storing information on an access right. Authorization can be performed using access right information included in the present resource.

The container resource corresponds to a resource existing at a lower part of a bseURI/container and stores data generated according to a CSE or an AE.

The group resource corresponds to a resource existing at a lower part of a baseURI/group and provides a function capable of processing various resources in a manner of binding the resources with each other.

The subscription resource corresponds to a resource existing at a lower part of a baseURI/subscription and performs a function of notifying a change of a state of the resource via a notification.

The discovery resource corresponds to a resource existing at a lower part of a baseURI/discovery and is used for discovering a specific resource.

Figure 6:
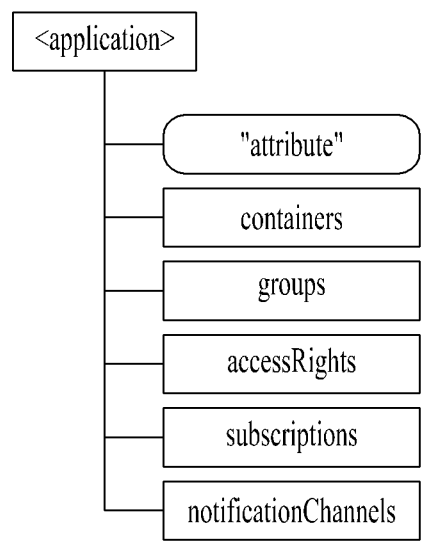
FIG. 6 is a diagram for an example of a resource for a specific M2M application.

FIG. 6 is a diagram for an example of a resource for a specific M2M application. As mentioned in the foregoing description, the resource for the specific M2M application can be stored in a CSE of a M2M gateway or an application resource of a resource of a common service layer. Similar to the root resource, the resource for the specific M2M application can include an attribute and a child resource. In FIG. 6, a notificationChannels resource may correspond to a resource related to the subscription resource.

Figure 7:
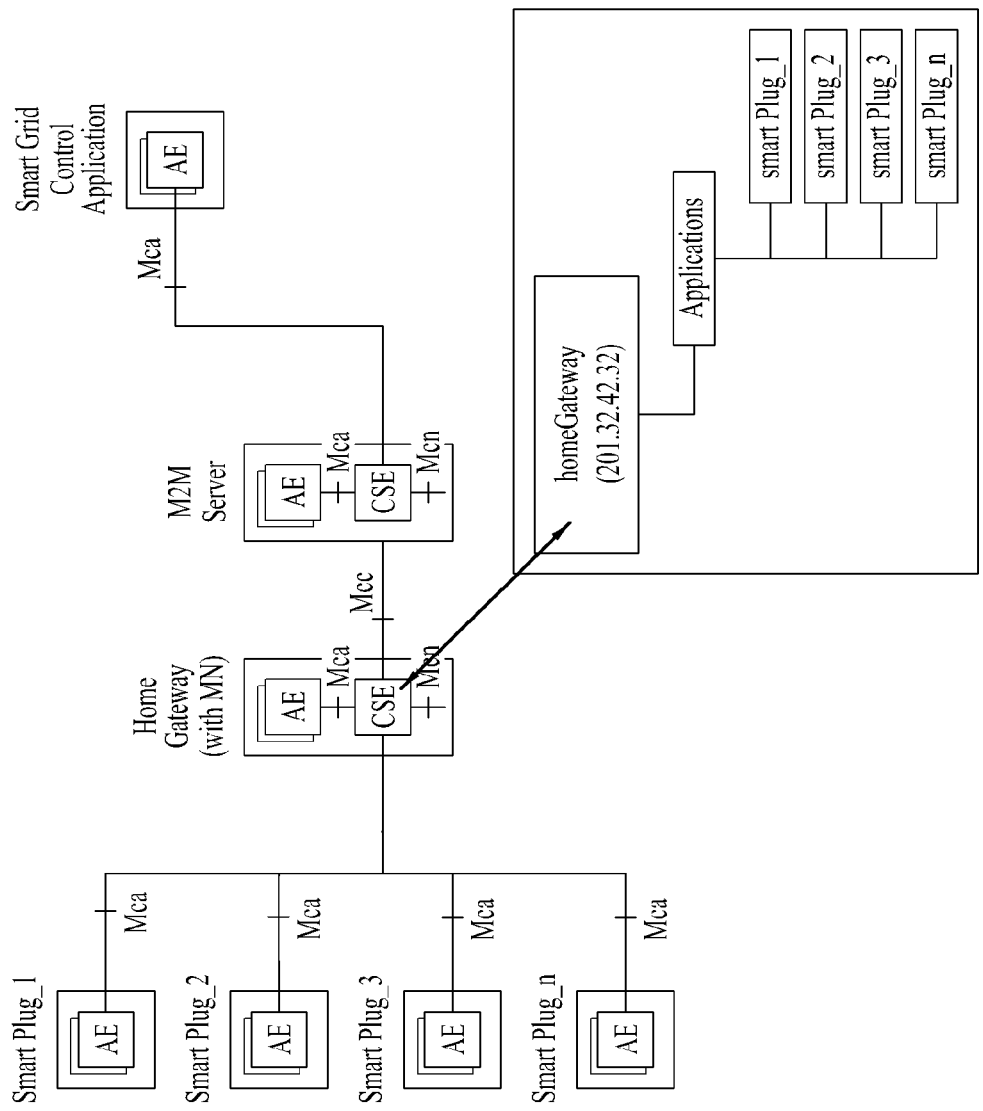
FIG. 7 is a diagram for an example of a M2M system.

FIG. 7 is a diagram for an example of a M2M system. FIG. 7 shows an example that a smart grid control application performs power control using smart plugs. The smart plugs (smartPlug_1 to smartPlug_n) operate as a M2M device including an ADN. Each M2M device (smartPlug_1 to smartPlug_n) corresponds to a M2M device having a constrained capability (or constrained M2M device) and does not include a CSE (common service entity). Hence, data (e.g., power metering information) generated by a smart plug cannot be stored by smart plug. The data can be stored by a M2M gateway or a M2M server connected with the smart plugs. In an example shown in FIG. 7, the smart plugs are connected with a hone gateway operating as the M2M gateway and all of the data generated by the smart plug can be stored in the home gateway.

Referring to FIG. 7, the home gateway includes a CSE and may be able to manage and store a data structure (or a resource) of a tree structure for smart plug applications. For instance, the resource managed and stored by the home gateway includes a root address value "201.32.42.32" and generates a resource for the smart plugs at a lower part of 201.32.42.32/application. An attribute and data information of each of the smart plugs can be stored in the resource generated at the lower part of 201.32.42.32/application. For instance, data information (e.g., power data information) of a smartPlug_1 can be stored in a corresponding resource generated at a lower part of 201.32.42.32/application/smartPlug_1/container. And, attribute information of the smartPlug_1 can be stored in attribute fields of 201.32.42.32/application/smartPlug_1. Whenever an attribute is changed or a new data is generated, each of the smart plugs can be stored in a resource or a data structure of the home gateway via Mca.

Meanwhile, the M2M gateway can be changed by various reasons in the M2M system. For instance, if a user equipment hops while changing a plurality of gateways, if pluralities of gateways connect a service to a single M2M terminal or if a legacy gateway is changed by one to one due to a prescribed reason, the M2M gateway can be changed. A case of changing the legacy gateway one to one corresponds to a service form of a case that a gateway is replaced with a new device from an old device one to one. For instance, a gateway can be replaced by one to one due to such a maintenance reason as firmware update or battery replacement or malfunction of the gateway.

When a M2M gateway is replaced by one to one in a M2M system, a problem in the following may occur. After a legacy gateway is replaced with a new gateway, in order to immediately resume a service for M2M devices, the new gateway should maintain configuration information of M2M applications as it is. Yet, all of the configuration information of the M2M applications communicating with the legacy gateway can be deleted due to the replacement of the gateway. The M2M devices should maintain a form of a legacy service as it is. Since the configuration information is stored in the M2M gateway in case of being connected via the M2M gateway, when the M2M gateway is changed/replaced, the configuration information should be reconfigured between the M2M device and the M2M gateway after the M2M gateway is changed/replaced.

If the huge numbers of M2M devices are connected with a single M2M gateway, a problem may become more serious. If the M2M gateway loses configuration information, in order to reconfigure the configuration information between a new gateway and many M2M applications, many delays may occur. Hence, the new gateway is unable to seamlessly provide a service which is performed based on the configuration information.

In particular, since an ADN does not include a CSE, the ADN is unable to maintain configuration information or data by itself. Hence, in case of a M2M gateway communicating with the ADN, if the M2M gateway is replaced, all configuration information and data stored in the M2M gateway can be lost. For this reason, when the M2M gateway is replaced, a problem may occur in a manner that data and management information of all ADNs communicating with the M2M gateway are lost or need to be reconfigured.

Hence, the present invention proposes a gateway replacement method capable of minimizing interruption of a M2M service without losing application configuration information and data when a M2M gateway is changed in a M2M system. The method according to the present invention considers two items described in the following. In the following, a M2M gateway is called a gateway and a M2M device can be called a device for clarity.

- If it is necessary to change a gateway, resources registered at the M2M gateway should be maintained at a certain place using any method while the gateway is changed. Otherwise, the resources stored in the gateway should be registered again after the gateway is changed and it becomes a burden to both a device and the gateway in the aspect of management.
- It is necessary for applications communicating with the changed gateway to recognize a replacement process in order not to communicate with the changed gateway while the gateway is replaced. Otherwise, packets transmitted to the changed gateway by the applications can be lost. Moreover, configuration information or data of the applications can also be lost.

Figure 8:
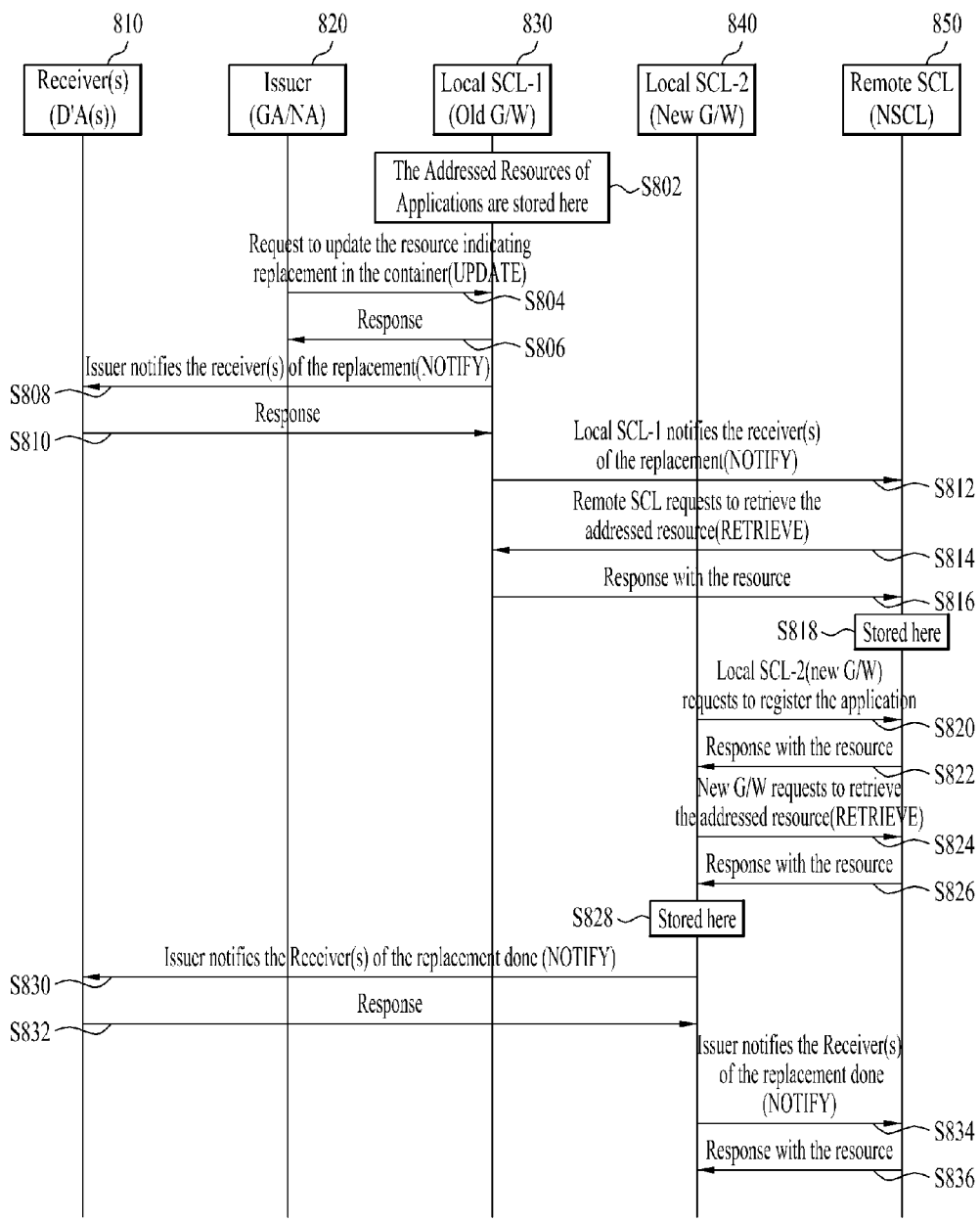
FIG. 8 is a flowchart for an example of a gateway replacement method according to the present invention.

FIG. 8 is a flowchart for an example of a gateway replacement method according to the present invention. In FIG. 8, a receiver 810 indicates a M2M device application (DA) and the receiver 810 may correspond to an application entity (AE) of a M2M device or an application layer. And, the receiver 810 may correspond to an application dedicated node (ADN) and may not include a common service entity (CSE) or a common service layer.

An issuer 820 indicates a M2M gateway application (GA) or a M2M network application (NA) and the issuer 820 may correspond to an application entity (AE) of a M2M gateway (or a middle node (MN)) or an application layer. A local SCL-1 830 indicates an SCL (service capability layer) of a legacy gateway (old gateway) and a local SCL-2 840 indicates an SCL of a new gateway or a target gateway. The local SCL-1 830 and the local SCL-2 840 may correspond to a CSE of a M2M gateway (or a middle node (MN)) and a common service layer, respectively.

A remote SCL 850 indicates an SCL (service capability layer) of a M2M server and the remote SCL 850 may correspond to a CSE of the M2M server (or an infrastructure node (IN)) or a common service layer.

Referring to FIG. 8, in the step S802, a resource for applications (e.g., 810, 820) can be stored in the local SCL-1 830 via such a procedure as registration and a service procedure.

In the step S840, the issuer 820 can generate a trigger signal indicating gateway replacement to initiate a gateway replacement procedure. The trigger signal may correspond to an update signal updating a resource for example. The trigger signal can be automatically generated via software, can be generated by a command from an external management portal or can be generated by an interaction with a user.

And, in the step S804, in order to generate the trigger signal, the issuer 820 can store the trigger signal in such a container as "replacement" among resources of a legacy gateway (local SCL-1 830) via a M2M common service layer. The information can be stored as follows.

```
<base>/applications/application/containers/replacement
[ contents]
    <replacementStatus>false</replacementStatus>
    <replacingDeviceID type=MAC>93:29:20:11:F1:F1
    </replacingDeviceID>
```

In the aforementioned example, information distinguished by <replacementStatus> and </replacementStatus> corresponds to information indicating a gateway change status. For instance, the information may have a Boolean value such as True or False. For instance, if a value of the information corresponds to True, it may indicate a status that gateway replacement is triggered. If a value of the information corresponds to False, it may indicates a normal status that the gateway replacement is not triggered. A relation between the value and the status may vary. And, for instance, replacement status information may have False as a default. As a different example, the replacement status information may have a different data type.

If the gateway replacement methodically occurs according to an external situation, a legacy gateway is able to be aware of identification information of a target gateway. If the legacy gateway knows the target gateway, the identification information of the target gateway can be added to a resource of the legacy gateway. The identification information of the target gateway can be distinguished from each other by <replacingDeviceID> and <replacingDeviceID>. And, a type of the identification information can be designated by <replacingDeviceID type=>. In the aforementioned example, a type of the identification information of the target gateway can be configured by a MAC (medium access control) address. Gateway identification information of a different type except the MAC address can be used as well. And, in case of performing firmware update, gateway replacement may occur by itself. In this case, identification information (e.g., self reference) of the gateway itself can be added.

In the step S806, if the trigger signal is received, the local SCL-1 830 may positively respond.

In the step S808, the local SCL-1 830 can notify the receiver 810 of initiation of the gateway replacement procedure via a M2M common service layer. For instance, the local SCL-1 830 can transmit the notification to the receiver using a contact attribute of a subscription resource of a resource indicated by identification information (e.g., URI) of the receiver 810 among resources of the local SCL-1. Having received the notification, the receiver 810 may not transmit any request or information to external until the gateway replacement procedure is completed. As a different example, although the receiver 810 transmits a request or information to the local SCL-1 820, it may be able to implement the request or the information to be in a state of pending to the receiver 810.

In the step S810, the receiver 810 can positively respond to the notification.

In the step S812, similar to the step S806, the local SCL-1 830 can notify the remote SCL 850 of the initiation of the gate replacement procedure via a M2M common service layer. For instance, the local SCL-1 830 can transmit the notification to the remote SCL using a contact attribute of a subscription resource of a resource indicated by identification information (e.g., URI) of the remote SCL among resources of the local SCL-1. Having received the notification, the remote SCL 850 may not transmit any request or information to the local SCL-1 830 until the gateway replacement procedure is completed. As a different example, although the remote SCL 850 transmits a request or information to the local SCL-1 830, it may be able to implement the request or the information to be in a state of pending to the remote SCL 850.

As a different example, the notification transmitted to the remote SCL 850 in the step S812 by the local SCL-1 830 can include address information (e.g., URI) on a resource of the local SCL-1 830. For instance, the address information can be represented by <backup> and </backup>. In this case, if a root address of the resource of the local SCL-1 830 corresponds to 201.32.42.32/baseURI, the notification transmitted in the step S812 can include information represented by <backup>201.32.42.32/baseURI</backup>. The M2M server (e.g., remote SCL 850) retrieves the resource of the SCL-1 830 based on the address information and may be able to store the resource as a backup.

In the step S814, the remote SCL 850 checks validity of the request and may be able to validate that the issuer 820 has access rights necessary for updating a resource. Subsequently, the remote SCL 850 requests to update the resource and may be able to automatically retrieve a resource of a legacy gateway to store the resource as a backup before a gateway is replaced. For instance, when the remote SCL 850 retrieves the resource, it may be able to use the URI (e.g., <backup>201.32.42.32/baseURI</backup>) indicating the resource of the local SCL-1 830 notified in the step S812.

In the step S816, the remote SCL 850 can positively respond to a request related to a resource of a legacy gateway. In this case, the legacy gateway 830 is in a state capable of being eliminated from a M2M system.

In the step S818, the resource of the local SCL-1 830 is moved to the remote SCL 850 and stored in the remote SCL 850.

In the step S820, after the legacy gateway 830 is eliminated from the M2M system, a local SCL-2 840 (or a new gateway) can transmit a registration request to the remote SCL 850. For instance, a gateway registration request may correspond to a CREATE message and the CREATE message can include information related to registration, indication information indicating gateway replacement, and identification information of a legacy gateway. The identification information of the legacy gateway can be provided to a target gateway in advance manually or via an OMA (open mobile alliance) device management (DM) protocol.

In the step S822, the remote SCL 850 can check whether the gateway registration request is valid or determine whether the gateway registration request corresponds to gateway replacement request. If the identification information of the target gateway (e.g., local CSE-2 840) provided in the step S804 is identical to a gateway identifier included in the registration request or identification information of the legacy gateway (e.g., local CSE-1 830) provided in the step S820 is matched with the information stored in the remote SCL 850 as a backup, the remote SCL can check the validity and determine the gateway replacement request. If the gateway registration request is valid, the remote SCL 850 can positively respond. In this case, a response signal can include information on an address (e.g., URI) at which a resource of the legacy gateway (e.g., local CSE-1 830) stored in the remote SCL 850 is stored. And, the response signal can grant a proper access right to the local SCL-2 840.

In the step S824, the local SCL-2 840 can transmit a retrieval request to the remote SCL 850 to obtain a resource of the local SCL-1 830. For instance, the retrieval request may correspond to a RETRIEVE message. The local SCL-2 840 retrieves a resource of the legacy gateway (e.g., local SCL-1 830) based on the address information of the resource received in the step S822 and may be then able to store the resource in a CSE of the local SCL-2 or a common service layer.

In the step S826, the remote SCL 850 can positively respond together with the resource of the legacy gateway. The local SCL-2 840 receives the resource and may be then able to inform legacy applications of update of a resource root address.

In the step S828, the resource of the local SCL-1 830 can be stored in the local SCL-2 840.

In the step S830, the local SCL-2 840 (or the new gateway) can notify the receiver 810 of completion of the gateway replacement procedure.

In the step S832, the receiver 810 can positively respond. Subsequently, the receiver 810 can transmit a generated request or information to the local SCL-2 840.

In the step S834, the local SCL-2 840 can notify the remote SCL 850 of completion of the gateway replacement procedure.

In the step S836, the remote SCL 850 can positively respond. Subsequently, the remote SCL 850 can transmit a generated request or information to the local SCL-2 840.

Although the receiver 810, who has received the gateway replacement notification in the step S808 or the step S812, or the remote SCL 850 transmits a request or information, if the request or the information is in a pending status, the request or the information can be transmitted to a destination after the gateway replacement procedure is completed.

Each of the steps described in FIG. 8 is just an example. A part of the steps of FIG. 8 can be omitted and steps not shown in FIG. 8 can be included instead. Each of the steps described in FIG. 8 can be implemented in an order different from an order shown in FIG. 8.

Figure 9:
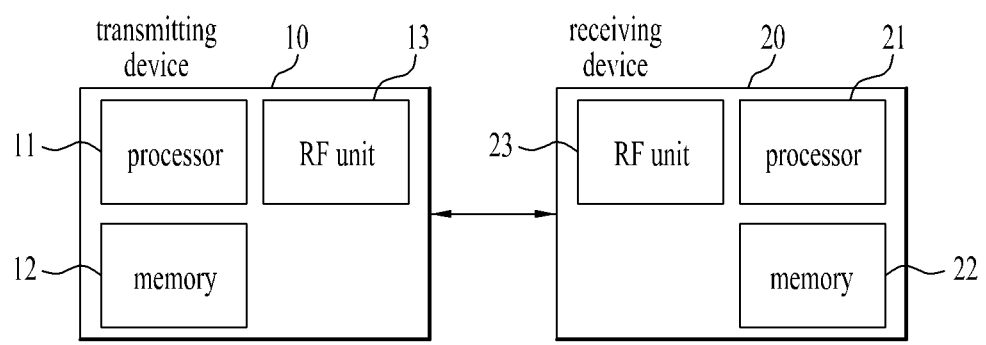
FIG. 9 illustrates a block diagram of a device according to embodiment(s) of the present invention.

FIG. 9 illustrates a block diagram of a device according to embodiment(s) of the present invention. In the present invention, each of M2M gateway, M2M server, or M2M device may operate as a transmitting device 10 or a receiving device 20.

The transmitting device 10 and the receiving device 20 respectively include radio frequency (RF) units 13, 23 for transmitting and receiving radio signals carrying information, data, signals, and/or messages, memories 12, 22 for storing information related to communication in a wireless communication system, and processors 11, 21 operatively connected to the RF units 13, 23 and the memories 12, 22 and configured to control the memories 12, 22 and/or the RF units 13, 23 so as to perform at least one of the above-described embodiments of the present invention.

The memories 12, 22 may store programs for processing and control of the processors 11, 21 and may temporarily storing input/output information. The memories 12, 22 may be used as buffers.

The processors 11, 21 control the overall operation of various modules in the transmitting device 10 or the receiving device 20. The processors 11, 21 may perform various control functions to implement the present invention. The processors 11, 21 may be controllers, microcontrollers, microprocessors, or microcomputers. The processors 11, 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11, 21. If the present invention is implemented using firmware or software, firmware or software may be configured to include modules, procedures, functions, etc. performing the functions or operations of the present invention. Firmware or software configured to perform the present invention may be included in the processors 11, 21 or stored in the memories 12, 22 so as to be driven by the processors 11, 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. A signal processing process of the receiving device 20 is the reverse of the signal processing process of the transmitting device 10. Under the control of the processor 21, the RF unit 23 of the receiving device 10 receives RF signals transmitted by the transmitting device 10. The processor 21 decodes and demodulates the radio signals received through the receive antennas and restores data that the transmitting device 10 wishes to transmit.

The RF units 13, 23 include one or more antennas. An antenna performs a function of transmitting signals processed by the RF units 13, 23 to the exterior or receiving radio signals from the exterior to transfer the radio signals to the RF units 13, 23. FIG. 9 illustrates that the transmitting device and the receiving device communicate through RF units respectively, but the present invention is not limited thereto. In the present invention, the transmitting device and the receiving device may communicate through a wired network. In this case, the RF unit may be replaced with a network interface unit (NIU).

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

Specific operations to be conducted by the base station in the present invention may also be conducted by an upper node of the base station as necessary. In other words, it will be obvious to those skilled in the art that various operations for enabling the base station to communicate with the terminal in a network composed of several network nodes including the base station will be conducted by the base station or other network nodes other than the base station. The base station may be referred to as a fixed station, a node-B (NB), an evolved node-B (eNB), an access point (AP), etc. A terminal may be referred to as a user equipment (UE), a mobile station (MS), a mobile subscriber station (MSS), etc.

The embodiments of the present invention may be implemented by various means, for example, hardware, firmware, software, or a combination thereof. In a hardware implementation, an embodiment of the present invention may be implemented by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software implementation, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to a communication apparatus such as a terminal, a server, a gateway, etc.

What is claimed is:
1. A method of changing a machine-to-machine (M2M) gateway communicating with at least one M2M device having a constrained capability in an M2M system comprising a first layer and a second layer, the method comprising:
   generating, by the M2M gateway, a signal triggering a gateway change;

transmitting, by the M2M gateway to an M2M server, a first notification indicating the gateway change;

receiving, by the M2M gateway from the M2M server, a retrieve request for data generated by the at least one M2M device having the constrained capability in response to the first notification, wherein the data generated by the at least one M2M device having the constrained capability is stored in a data structure of a tree structure within the M2M gateway; and transmitting, by the M2M gateway to the M2M server, the data structure in response to the retrieve request, wherein the at least one M2M device having the constrained capability does not contain the first layer, wherein the first layer corresponds to a common service layer containing services commonly provided by the M2M system, and wherein the second layer corresponds to an application layer executing a specific M2M application.

2. The method of claim 1, wherein the data structure comprises first information indicating a gateway change status and second information indicating identification information of a target gateway, and wherein the signal comprises a value of the first information configured by a specific value.

3. The method of claim 1, wherein the data structure comprises a first lower data structure for the M2M server, and wherein the first notification comprises a universal resource identifier (URI) of the first lower data structure.

4. The method of claim 3, wherein the M2M server is configured to retrieve and store the data structure using the URI.

5. The method of claim 1, wherein the data structure further comprises a second lower data structure for the at least one M2M device, the method further comprising:

transmitting, by the M2M gateway to the at least one M2M device, a second notification indicating the gateway change via the first layer, wherein the at least one M2M device does not transmit any information to the M2M gateway until the gateway change is completed after the at least one M2M device receives the second notification.

6. The method of claim 1, wherein the signal is generated by the first layer of the M2M gateway, and the first notification is transmitted via the first layer.

7. The method of claim 1, wherein the data is generated by the second layer of the M2M device and stored in the first layer.

8. A gateway for communicating with at least one machine-to-machine (M2M) device having a constrained capability in an M2M system comprising a first layer and a second layer, the gateway comprising:

a radio frequency (RF) unit; and a processor configured to:

generate a signal triggering a gateway change, control the RF unit to transmit, to an M2M server, a first notification indicating the gateway change through the RF unit, control the RF unit to receive, from the M2M server, a retrieve request for data generated by the at least one M2M device in response to the first notification, wherein the data generated by the at least one M2M device having the constrained capability is stored in a data structure of a tree structure within the M2M gateway, and control the RF unit to transmit, to the M2M server, the data structure in response to the retrieve request, wherein the at least one M2M device having the constrained capability does not contain the first layer, and wherein the first layer corresponds to a common service layer containing services commonly provided by the M2M system, and wherein the second layer corresponds to an application layer executing a specific M2M application.

9. The gateway of claim 8, wherein the data structure comprises first information indicating a gateway change status and second information indicating identification information of a target gateway, and wherein the signal comprises a value of the first information configured by a specific value.

10. The gateway of claim 8, wherein the data structure comprises a first lower data structure for the M2M server, and wherein the first notification comprises a universal resource identifier (URI) of the first lower data structure.

11. The gateway of claim 10, wherein the M2M server is configured to retrieve and store the data structure using the URI.

12. The gateway of claim 10, wherein the data structure further comprises a second lower data structure for the at least one M2M device, wherein the processor is further configured to:

control the RF unit to transmit a second notification indicating the gateway change to the at least one M2M device via the first layer, wherein the at least one M2M device does not transmit any information to the M2M gateway until the gateway change is completed after the at least one M2M device receives the second notification.

13. The gateway of claim 8, wherein the signal is generated by the first layer of the M2M gateway, and the first notification is transmitted via the first layer.

14. The gateway of claim 8, wherein the data is generated by the second layer of the M2M device and stored in the first layer.

* * * * *